United States Patent [19]

Grabowski

[11] Patent Number: 5,487,519
[45] Date of Patent: Jan. 30, 1996

[54] RETRACTABLE BEVERAGE CONTAINER HOLDER

[75] Inventor: David N. Grabowski, Rochester Hills, Mich.

[73] Assignee: Chivas Products Limited, Sterling Heights, Mich.

[21] Appl. No.: 37,319

[22] Filed: Mar. 26, 1993

[51] Int. Cl.⁶ ............................................... A47K 1/08
[52] U.S. Cl. .................................... 248/311.2; 224/281
[58] Field of Search ........................... 211/1.3; 224/277, 224/278, 281, 42.42, 42.45 R, 42.46; 248/311.2, 309.1, 316.4; 297/188.14, 188.15, 188.16, 188.17

[56] References Cited

U.S. PATENT DOCUMENTS

| | | | |
|---|---|---|---|
| 1,970,962 | 8/1934 | Hinckley | 224/42.45 |
| 4,619,386 | 10/1986 | Richardson | 224/42.45 |
| 4,738,423 | 4/1988 | DiFilippo et al. . | |
| 4,783,037 | 11/1988 | Flowerday . | |
| 4,854,536 | 8/1989 | Lorence et al. . | |
| 4,892,281 | 1/1990 | DiFilippo et al. . | |
| 4,907,775 | 3/1990 | Lorence et al. . | |
| 4,928,865 | 5/1990 | Lorence et al. . | |
| 4,955,571 | 9/1990 | Lorence et al. . | |
| 4,981,277 | 1/1991 | Elwell | 248/311.2 |
| 5,024,411 | 6/1991 | Elwell | 248/311.2 |
| 5,025,919 | 6/1991 | Brinker et al. | 224/42.45 |
| 5,060,899 | 10/1991 | Lorence et al. . | |
| 5,072,909 | 12/1991 | Huang . | |
| 5,072,989 | 12/1991 | Spykerman et al. . | |
| 5,096,152 | 3/1992 | Christiansen et al. . | |
| 5,104,184 | 4/1992 | Kwasnik et al. . | |
| 5,104,185 | 4/1992 | Christiansen et al. . | |
| 5,104,186 | 4/1992 | Kwasnik et al. . | |
| 5,104,187 | 4/1992 | Fischer et al. . | |
| 5,131,716 | 7/1992 | Kwasnik et al. . | |
| 5,171,061 | 12/1992 | Marcusen | 248/311.2 |
| 5,284,314 | 2/1994 | Misaras et al. | 297/188.17 X |
| 5,294,026 | 3/1994 | McGirt | 224/42.46 |

FOREIGN PATENT DOCUMENTS

| | | |
|---|---|---|
| 516354 | 1/1931 | Germany . |
| WO89/05602 | 6/1989 | WIPO . |

*Primary Examiner*—Robert W. Gibson, Jr.
*Assistant Examiner*—Korie H. Chan
*Attorney, Agent, or Firm*—Harness, Dickey & Pierce

[57] ABSTRACT

A beverage container holder has a housing which encases a slidable frame. The frame has an ashtray disposed within a central open area and a pair of arms pivotably attached to the frame to either side of the ashtray. The frame is movable between a retracted and an extended position and the pair of arms are pivotable from an open position to a closed position. When the frame is in its extended position, access to the ashtray is provided and one or both of the arms can be moved from their closed position to their open position. In their open position, each arm in conjunction with the frame, define a partially circular aperture to accommodate a beverage container. In one embodiment, a drawer is provided in the housing for keeping coins, pens, pencils, paper or the like. In another embodiment, a drawer is provided in the frame.

12 Claims, 6 Drawing Sheets

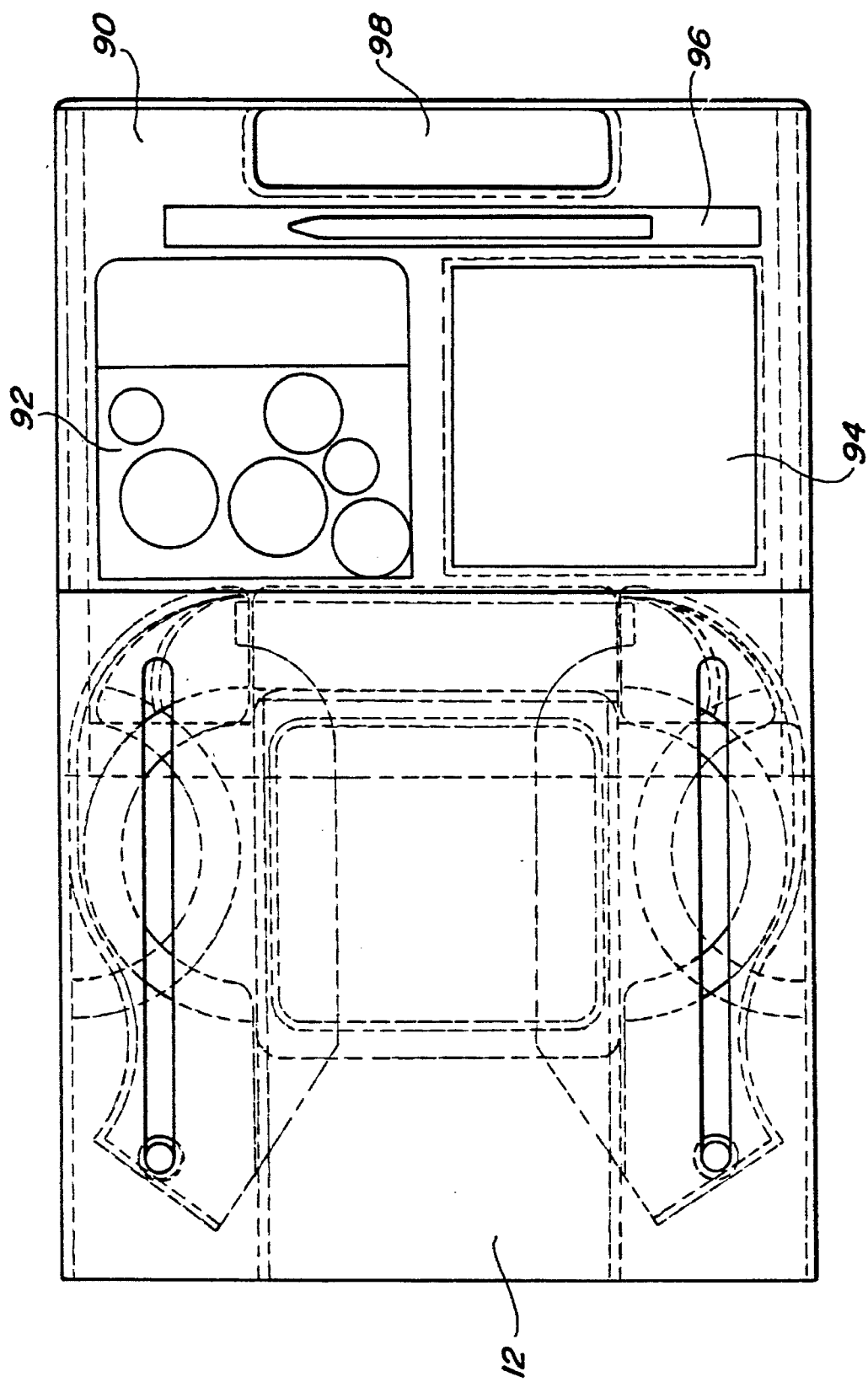

RETRACTABLE BEVERAGE CONTAINER HOLDER

FIELD OF THE INVENTION

The present invention relates to beverage container holders. More particularly, the present invention relates to beverage container holders which extend from a housing when in use and slide into the housing for compact storage when not in use.

BACKGROUND OF THE INVENTION

With an ever increasing number of miles being driven by individuals, it is frequently convenient to consume some type of beverage while an occupant is in a vehicle. The ability to place the beverage container upon a stable support surface or in a receptacle is a desirable option and is particularly useful for the driver of the vehicle who at times may require the use of both hands.

The automotive companies have responded to this conveniency feature by offering a wide variety of beverage container holders. One typical beverage container holder, offered as original equipment on automobiles, includes a deep cylindrical support pocket formed in an armrest, a folding back seat, a console or other support member into which a beverage container or cup can be placed. These structures while being useful to hold beverage containers have certain drawbacks. The pocket in the armrest, seat back or console gathers dirt and foreign material including spillage which is difficult to remove because the pocket is deep and its bottom is not readily accessible. Other typical beverage container holders include holders which are mounted in such diverse locations as adjacent the dash board, the vehicle door, the floor board and upon the passenger seat. Some or all of these beverage holders may be retractable for storage when not in use.

These retractable or concealable containers are well known in the art. They are particularly useful in a motor vehicle where space is at a premium. When not in use, the beverage container holder may be stored in the dashboard, the console or an armrest thereby freeing the space occupied by the open beverage container holder. Because available storage space for the beverage container holder is also at a premium, the beverage container holder must collapse or told to have a compact storage shape. Minimizing the storage size of beverage container holders is particularly important when the holder is designed to hold multiple containers.

SUMMARY OF THE INVENTION

The present invention provides a retractable beverage container holder with several unique and beneficial features. The holder is particularly suited for use with motor vehicles and accommodates a wide range of sizes and types of beverage containers.

The beverage container holder includes a housing mountable to a support surface and a frame slidably mounted to the housing. The support surface for mounting the housing is typically located in the dashboard, console or armrest of a motor vehicle. The frame is slidably mounted to the housing such that the frame is out of sight in its retracted position, stored within the housing. When the frame is extended, a pair of beverage container openings are exposed. The beverage container openings defined by the extended frame are generally circular to accommodate conventional coffee mugs, soft drink cans, paper cups, plastic cups or the like. An ashtray and/or a coin holder may be located between the two beverage container openings if desired.

In the preferred embodiment, approximately one half of the frame defining each beverage container opening is stationary with respect to the frame but movable with respect to the housing. The other approximately one half of the frame defining each beverage container opening is movable with respect to the frame and the housing. In the retracted or concealed position, the movable portion of the frame defining each beverage container opening is folded such that the movable beverage container opening is folded over the top of the stationary beverage container opening conserving space. When the frame is extended, the movable portion of the frame pivots with respect to the rest of the frame to form the generally circular beverage container opening. The feature of folding the approximately one half of the beverage container opening upon the other approximately one half minimizes the storage space and allows the placement of the ashtray and/or coin holder between the two beverage container openings.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 6 is a plan view of a coin holder and notepad in the extended position in accordance with another embodiment of the present invention;

DETAILED DESCRIPTION OF THE PREFERRED EMBODIMENT

Figure 1:
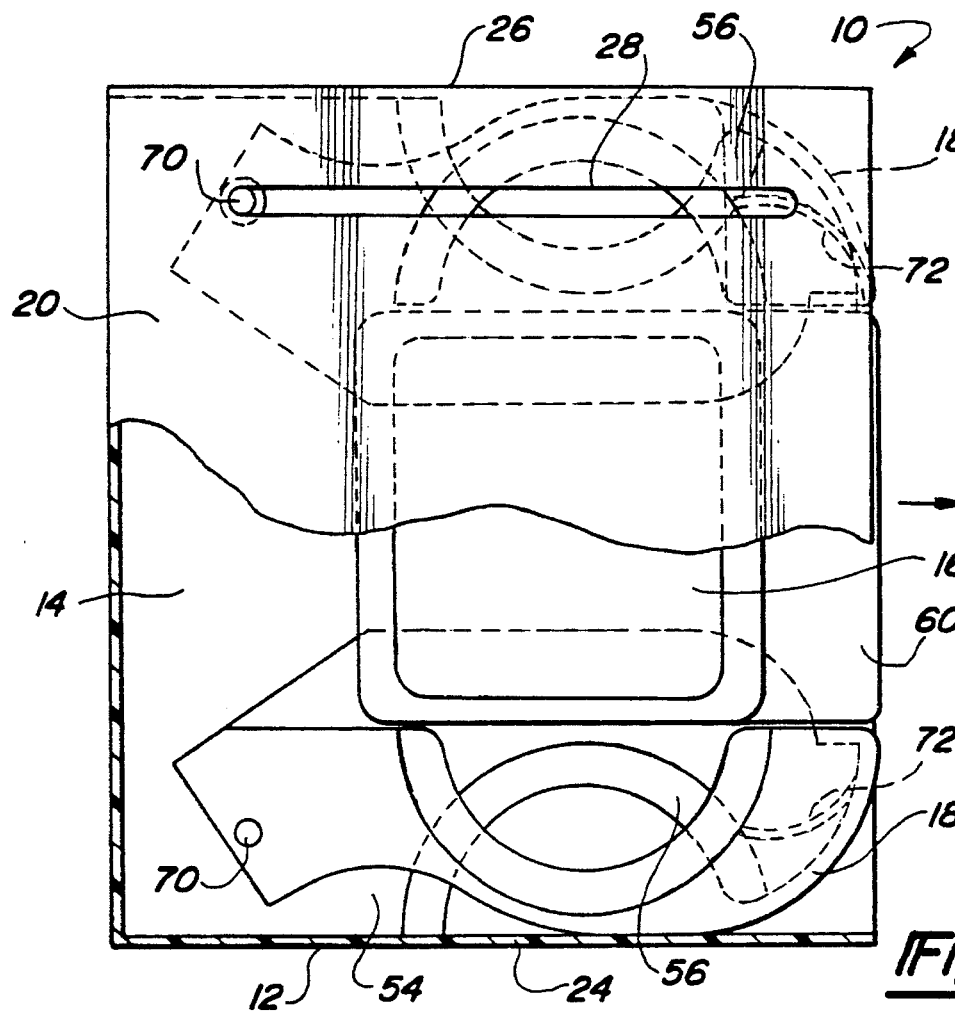
FIG. 1 is a plan view, partially cut away, of the beverage container holder of the present invention in the retracted position.

Referring now to the drawings in which like reference numerals designate like or corresponding parts through the several views, there is shown in FIGS. 1 through 5 a beverage container holder 10 in accordance with the present invention. Holder 10 is comprised of a housing 12, a frame 14, an ashtray 16, and a pair of pivotable arms 18. Housing 12 is a generally rectangular shaped box adapted to be fixedly secured to the support structure (not shown) located within a vehicle's dashboard, console, armrest or other areas within the vehicle. Housing 12 can be fixedly secured to the support structure of the vehicle or housing 12 can be fixedly secured to a bracket (not shown) which is then in turn fixedly secured to the support structure of the vehicle by means known well in the art. Housing 12 comprises an upper plate 20, a lower plate 22 and a pair of side plates 24 and 26. Upper plate 20 has a pair of grooves 28 which are used to locate and guide frame 14 with respect to housing 12 as will be described later herein. Each sidewall 24 and 26 in the area adjacent to lower plate 22 has a pair of triangular shape guides 32 and 34 which are used to guide and locate frame 14 with respect to housing 12 as will be described later herein.

Figure 5:
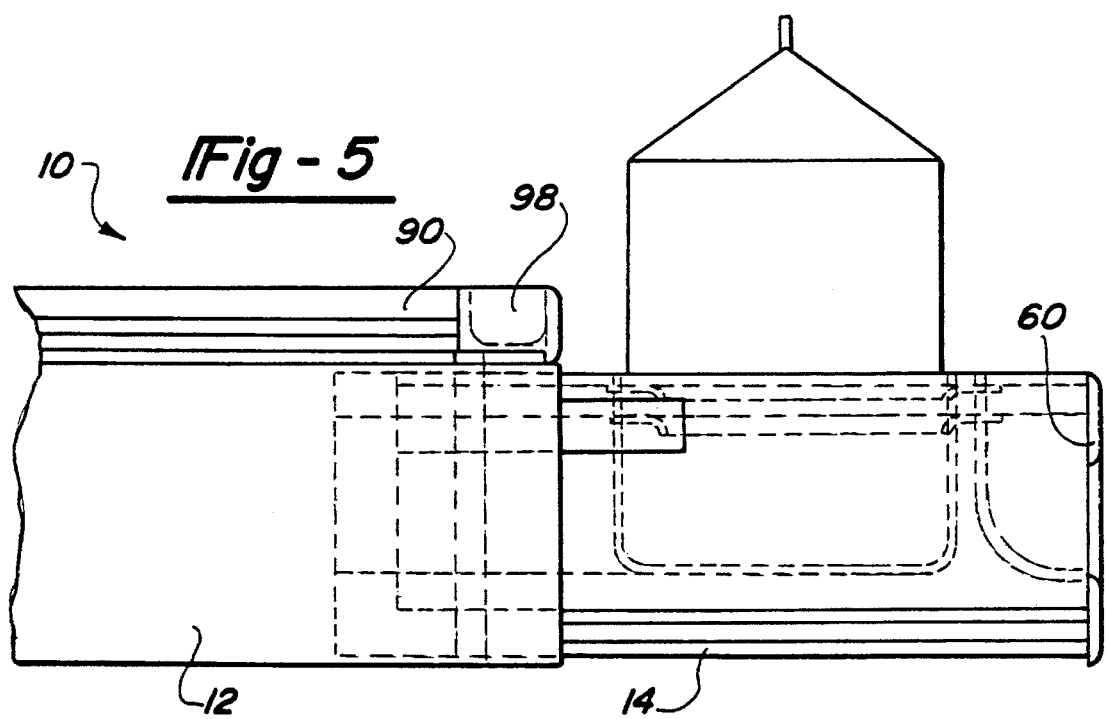
FIG. 5 is a side view of the beverage container holder of the present invention in the extended position with the ashtray removed to expose a rectangular beverage container holder.
Figure 2:
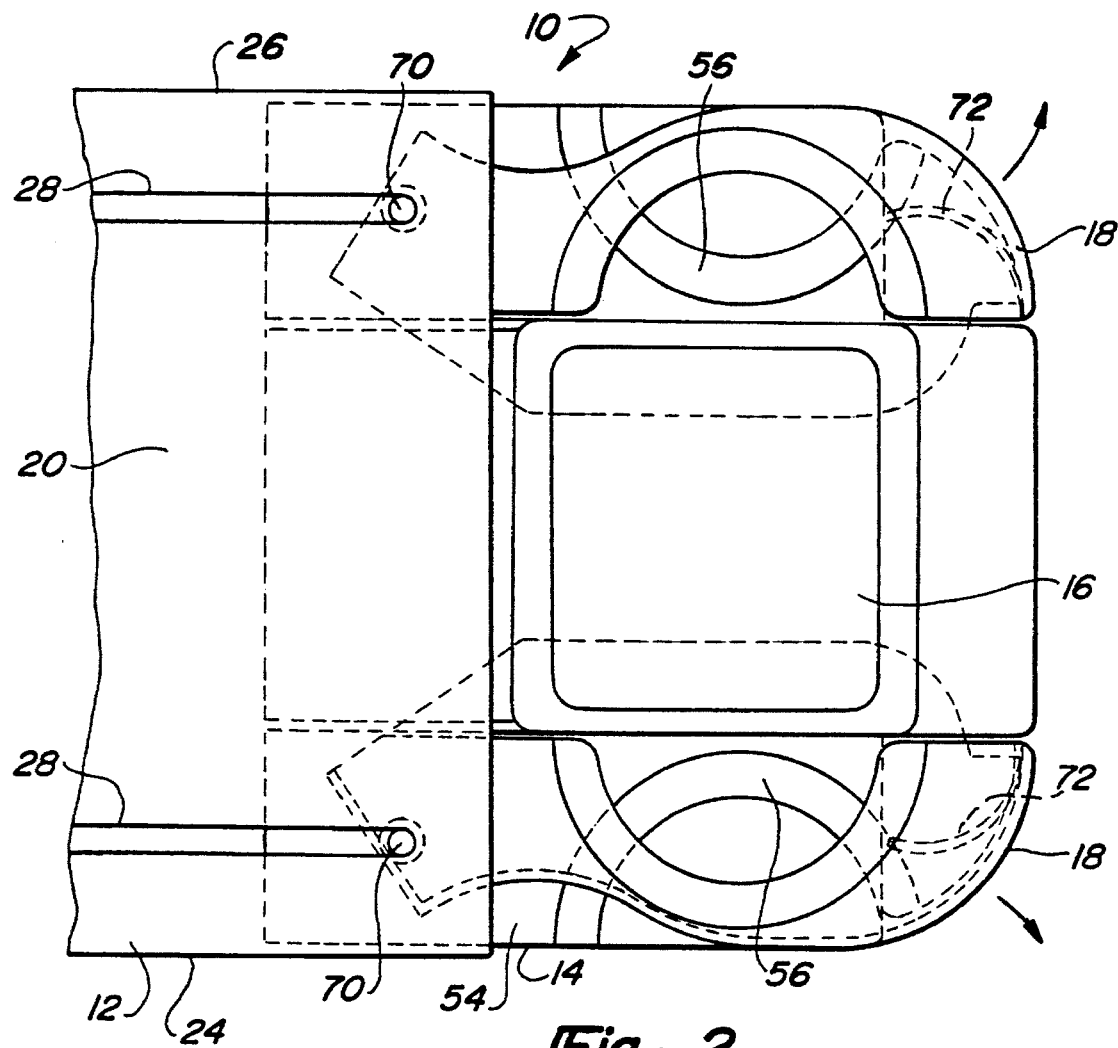
FIG. 2 is a plan view of the beverage container holder of the present invention in the extended position with the holders still retracted.
Figure 4:
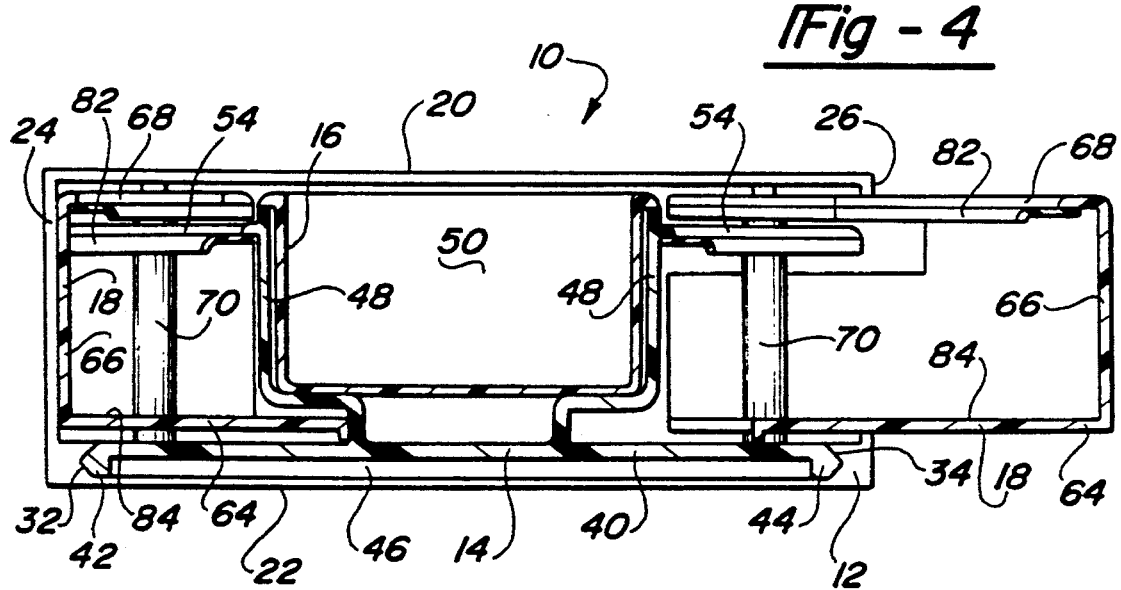
FIG. 4 is a front sectional view of the beverage container holder shown in FIG. 1 having one pivotal arm in the closed position of FIG. 2 and one in the open position of FIG. 3.
Figure 3:
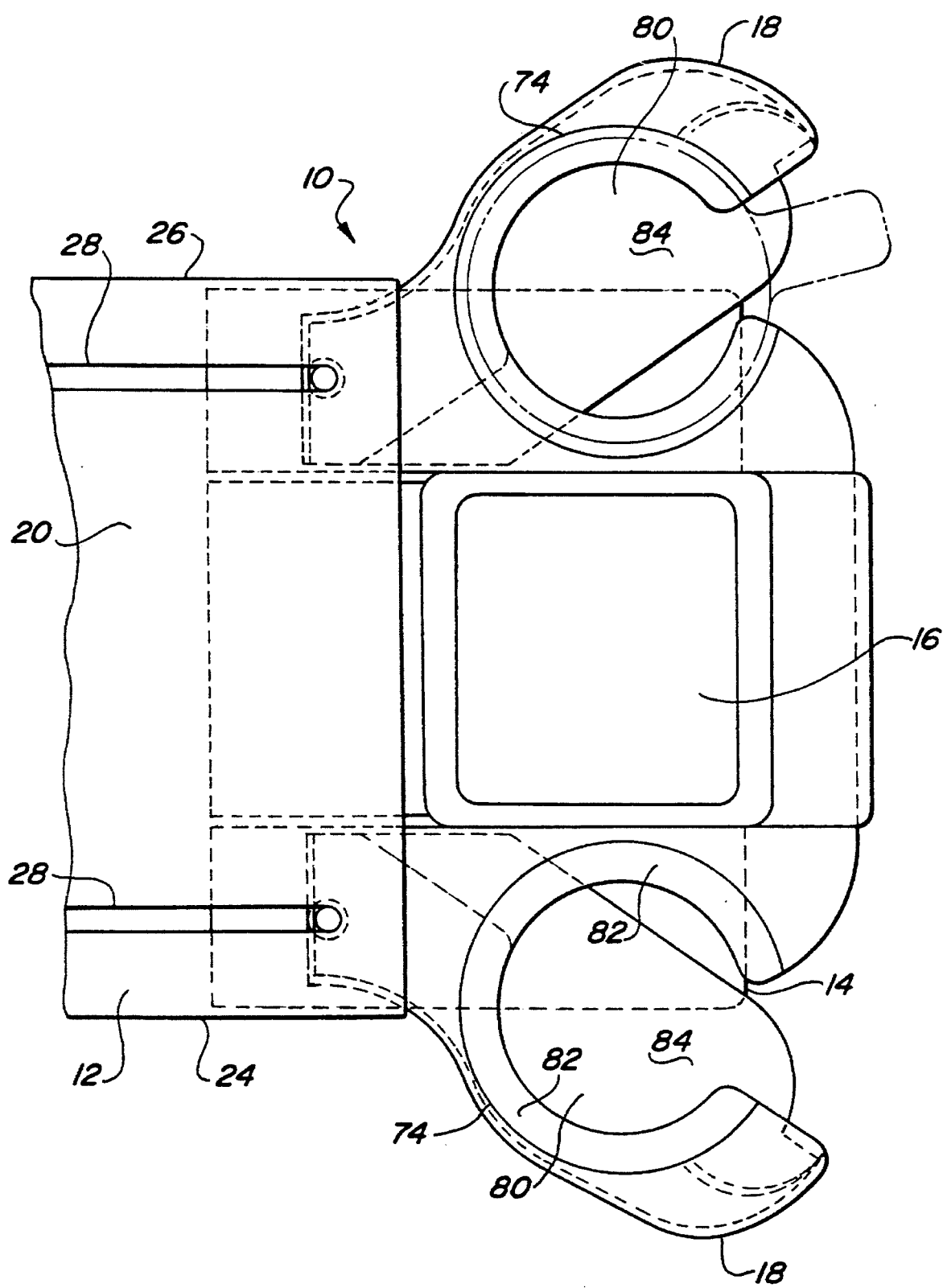
FIG. 3 is a plan view of the beverage container holder of the present invention in the extended position with the holders extended.

Frame 14 is slidably received within housing 12 and is operable to be moved from a retracted position as shown in FIG. 1 to an extended position as shown in FIGS. 2 and 3. Frame 14 has a generally lower planar wall 40 adapted at opposite outside edges 42 and 44 to engage the pair of triangular shaped guides 32 and 34, respectively, to guide and locate frame 14 within housing 12. A cut out region 46 may be provided in the central portion of lower planar wall 40 for the saving of weight and material if desired. A plurality of vertically disposed walls 48 extend generally upward and perpendicular to lower wall 40 and form three sides of a generally rectangular receptacle 50 for locating removable ashtray 16. Ashtray 16 is removable for cleaning purposes and once removed, generally rectangular receptacle 50 is exposed which can then serve as a storage receptacle for a boxed beverage such as a milk carton as shown in FIG. 5. Extending from the top of upward extending walls 48 generally perpendicular to vertical walls 48 and generally parallel to lower wall 44 is upper wall 54. Upper wall 54 includes a pair of partial circular apertures 56 which form a portion of the circular opening for receiving the beverage container. The area between lower wall 44 and upper wall 54 which will eventually be exposed to the interior of the vehicle is provided with a pull handle 60.

Each pivotable arm 18 comprises a lower wall 64, a side wall 66 and an upper wall 68. Lower wall 64 and upper wall 68 extend generally parallel to each other and are spaced from each other by virtue of side wall 66. Each pivotable arm 18 is pivotally attached between lower wall 40 and upper wall 54 of frame 14 by a pivot pin 70. Pivot pin 70 extends from lower wall 40 of frame 14 through lower wall 64 of arm 18, through upper wall 68 of arm 18, through upper wall 54 of frame 14 and into a respective groove 28 located in housing 12. Lower wall 64 of arm 18 slidingly engages lower wall 40 of frame 14 by virtue of pivot pin 70. Upper wall 68 of arm 18 slidingly engages upper wall 54 of frame 14 also by virtue of pivot pin 70. The distance over the outside of lower wall 64 and upper wall 68 of arm 18 is slightly less than the inside distance between lower wall 40 and upper wall 54 of frame 14 to provide for a slip fit between the two pieces. In the retracted position as shown in FIG. 2 and FIG. 5, lower wall 64 is nestled beneath ashtray 16, upper wall 68 is positioned adjacent to ashtray 16 and side wall 66 forms a portion of the area of holder 10 which is exposed to the interior of the vehicle. An additional vertical wall 72 can be added to finish the ends of handle 60 and provide an aesthetically pleasing exterior look to holder 10 if desired.

When each arm 18 is positioned in its extended position as shown in FIG. 3 by being pivoted on pivot pin 70 as shown in FIG. 3, a partially circular aperture 74 formed in upper wall 68 mates with one of the partial circular openings 56 in upper wall 54 to form a generally circular opening 80 which is designed to receive the beverage container. The edges of partial circular aperture 74 and partial circular opening 56 may each be provided with a foam rubber ring 82 which enables circular opening 80 to accommodate a variety of beverage container sizes without having the container rattle around. In addition, the upper surface of lower wall 64 of each arm 18 can be supplied with a rubber pad 84 to reduce the amount of rattling of the beverage container placed in holder 10. Partial circular opening 80 does not extend into a complete circle. A portion of the circumference of the circle is left open in order to accommodate the handle of the coffee cup or the like as shown in phantom in FIG. 3. By positioning this open area of partial circular opening 80 adjacent to the front face of holder 10, the coffee cup handle is positioned at the most accessible location for the vehicle occupants.

The operation of holder 10 begins with holder 10 in the retracted position as shown in FIG. 1. When access to ashtray 16 is desired, the individual simply pulls on handle 60 and frame 14 slides out of housing 12 to expose ashtray 16 as shown in FIG. 2. The individual pivotable arms 18 remain in a closed position due to the slip fit relationship between arm 18 and frame 14. If the individual desires to place a boxed type of drink in holder 10, ashtray 16 can be removed, and set aside exposing generally rectangular receptacle 50 as shown in FIG. 5. After frame 14 has been extended from housing 12, either or both of the individuals in the vehicle are able to pivot one or both of the individual pivotable arms 18 out from frame 14 by pulling on the individual handles created by side wall 66 and vertical wall 72 of arm 18. Once positioned in their open position as shown in FIG. 3, arms 18 and frame 14 form the individual holders of holder 10. When it becomes necessary to close holder 10, all that needs to be done is to push arms 18 into their closed position and push frame 14 into its retracted position. As an alternative, it is possible to simply push frame 14 into its retracted position and rely on the edges of housing 12 working against side walls 66 of arms 18 to cam arms 18 into a closed position if desired.

In order to provide additional convenience to the operator and other occupants of the vehicle, it may be desirable to add a drawer 90 as shown in FIGS. 5 and 6 to beverage container holder 10. Drawer 90 slidably engages housing 12 and is normally placed above frame 14 and can include such conveniences as a coin holder 92, a pad of note paper 94, a pencil or pen holder 96 and a handle 98 to simplify access to drawer 90.

Figure 7:
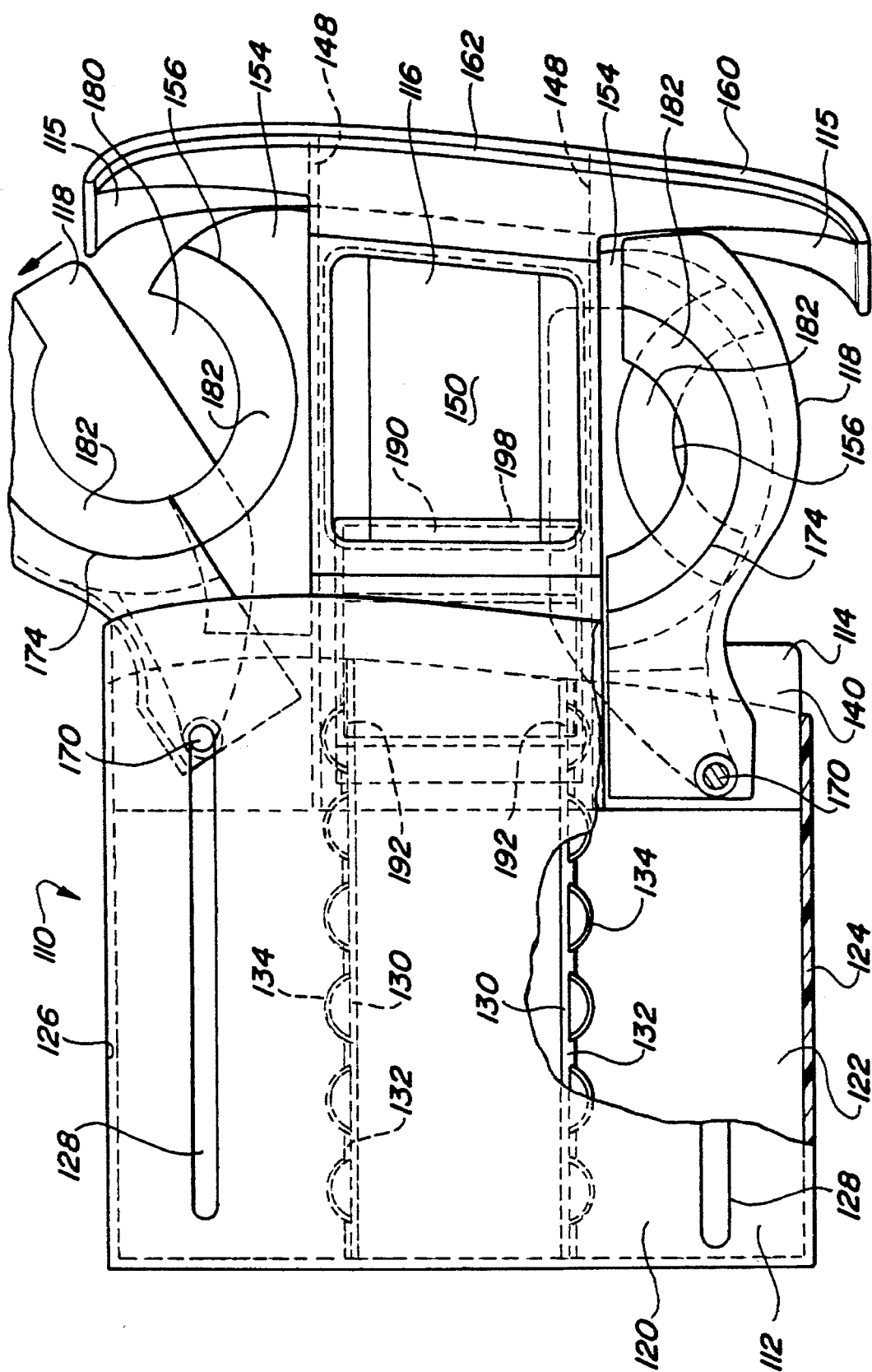
FIG. 7 is a partially cut away view similar to that of FIG. 3 but showing one pivotable arm in the closed position and one pivotable arm in the open position according to another embodiment of the present invention.
Figure 8:
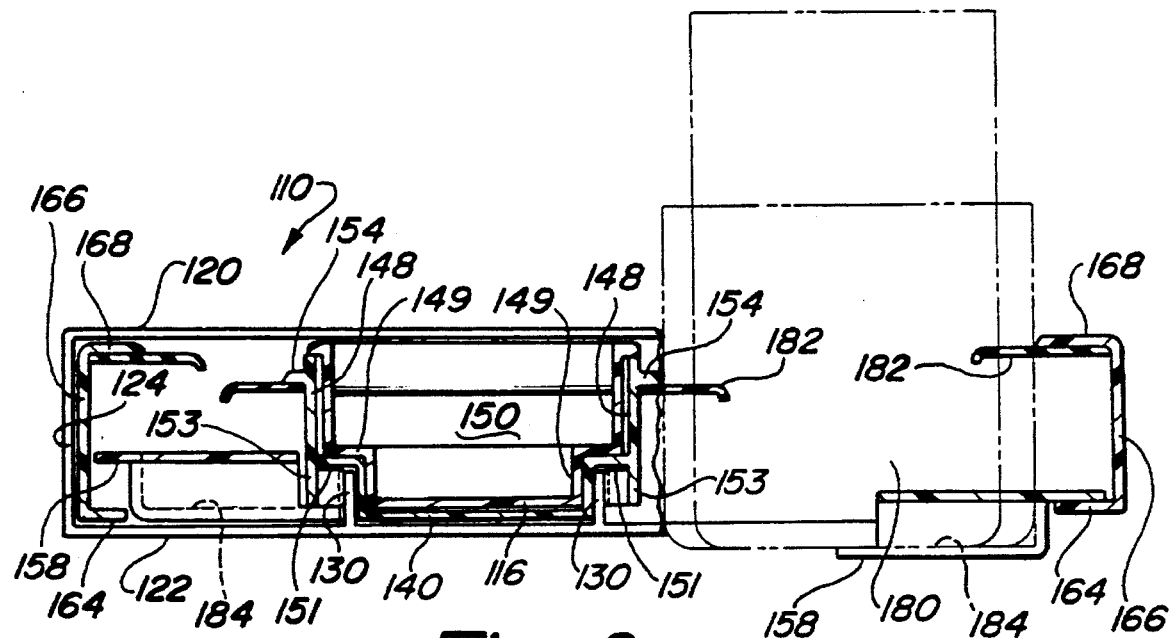
FIG. 8 is a front section view similar to that of FIG. 4 but showing the sliding engagement of the beverage container holder shown in FIG. 7 and showing one arm in a closed position and one arm in an opened position.
Figure 9:
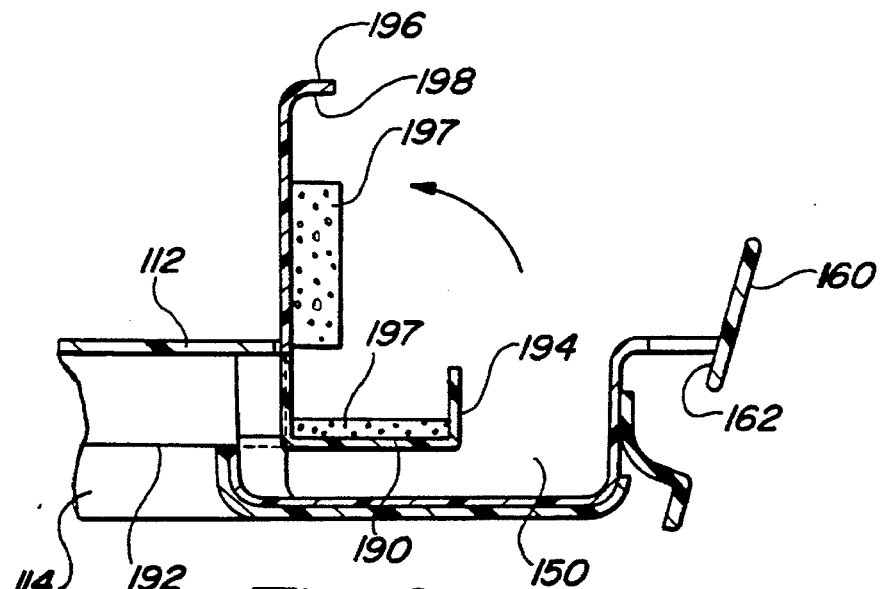
FIG. 9 is a side view of a coin holder in the extended position in accordance with another embodiment of the present invention.

Referring now to FIGS. 7 through 9, there is shown a beverage container holder 110 in accordance with another embodiment of the present invention. Holder 110 is comprised of a housing 112, a frame 114, an ashtray 116 and a pair of pivotable arms 118. Housing 112 is a generally rectangular shaped box adapted to be fixedly secured to the support structure (not shown) located within a vehicle's dashboard, console, armrest or other areas within the vehicle. Housing 112 can be fixedly secured to the support structure of the vehicle or housing 112 can be fixedly secured to a bracket (not shown) which is then in turn fixedly secured to the support structure of the vehicle by means known well in the art. Housing 112 comprises an upper plate 120, a lower plate 122 and a pair of side plates 124 and 126. Upper plate 120 has a pair of grooves 128 which are used to locate and guide frame 114 with respect to housing 112 as will be described later herein. Lower plate 122 includes a pair of walls 130 extending generally perpendicular from lower plate 122 towards upper plate 120. Walls 130 extend longitudinally over the entire length of lower plate 122. Each wall 130 has a plurality of dovetailed shaped projections 132 extending from the outer surface thereof. The plurality of projections 132 are designed to engage a plurality of leaf springs 134 which extend away from each wall 130 for engagement with frame 114 as will be described later herein. The plurality of springs 134 are operable to control the load necessary to move frame 114 between a retracted and an extended position.

Frame 114 is slidably received within housing 112 and is operable to be moved from a retracted position similar to the retracted position of the embodiment shown in FIG. 1 to an extended position as shown in FIG. 7. Frame 114 has a generally lower planar wall 140. The width of lower wall 140 is designed to be a clearance fit between the pair of side plates 124 and. 126 of housing 112. Lower wall 140 is a generally T-shaped wall allowing for clearance of each beverage container holder as will be described later herein. A pair of vertically disposed walls 148 extend generally upward and perpendicular to lower wall 140 and form two sides of a generally rectangular receptacle 150 for locating removable ashtray 116. Ashtray 116 is removable for cleaning purposes and once removed, generally rectangular receptacle 150 is exposed which can then serve as a storage receptacle for a boxed beverage such as a milk carton. Each vertical wall 148 has a stepped portion 149 which forms a generally rectangular cavity 151 extending the length of each wall 148 to partially enclose the plurality of leaf springs 134 when frame 114 is in the retracted position. A vertical arm 153 extends downward from each wall 148 to further enclose the plurality of leaf springs 134 as shown in FIG. 8. Each arm 153 reacts against the plurality of leaf springs 134 to provide for the desired load necessary to move frame 114 between a retracted and extended position. Extending from the top of vertical walls 148 generally perpendicular to vertical walls 148 and generally parallel to lower wall 140 is upper wall 154. Upper wall 154 includes a pair of partial circular apertures 156 which form a portion of the circular opening for receiving the beverage container. The front portion or the area between lower wall 140 and upper wall 154 which will eventually be exposed to the interior of the vehicle is equipped with an aesthetically pleasing cover 160 forming a pull handle 162. Cover 160 extends outward from both vertical walls 148 beyond the area occupied by each retracted pivotable arm 118 to provide a finished look to holder 110 when holder 110 is in its retracted position.

Each pivotable arm 118 comprises a cup base 158, a lower wall 164, a side wall 166 and an upper wall 168. Lower wall 164 and upper wall 168 extend generally parallel to each other and are spaced apart from each other by virtue of sidewall 166. Each pivotable arm 118 is pivotally attached between lower wall 140 and upper wall 154 of frame 114 by a pivot pin 170. Pivot pin 170 extends from lower wall 140 of frame 114 through lower wall 164 of arm 118, through upper wall 168 of arm 118, through upper 154 of frame 114 and into a respective groove 128 located in housing 112. Lower wall 164 of arm 1.18 slidingly engages lower wall 140 of frame 114 by virtue of pivot pin 170. Upper wall 168 of arm 118 slidingly engages upper wall 154 of frame 114 also by virtue of pivot pin 170. The distance over the outside of lower wall 164 and upper wall 168 of arm 118 is slightly less than the inside distance between lower wall 140 and upper wall 154 of frame 114 to provide for a slip fit between the two pieces. In the retracted position, as shown in FIGS. 7 and 8, lower wall 164 is nested beneath ashtray 116, upper wall 168 is positioned adjacent to ashtray 116 and side wall 166 is tucked behind front cover 160. Cup base 158 is also pivotably attached to pivot pin 170 and is operable to move from an upper or stored position as shown on the left side of FIG. 8 to a lower or in use position as shown on the right side of FIG. 8. Cup base 158 is moved between its closed and open position by virtue of a cammed surface 115 of frame 114. As each arm 118 is moved from a closed position to an open position, the cammed relationship between the cammed surface 115 and the end portion of cup base 158 provide for the lowering of cup base 158 into its open position. When each arm 118 is moved from its open position to its closed position, this cammed relationship between the cammed surface 115 and cup base 158 raise cup base 158 into its closed position.

When each arm 118 is positioned in its extended position by being pivoted on pivot pin 170 as shown in FIGS. 7 and 8, a partially circular aperture 174 formed in upper wall 168 mates with a respective partial circular opening 156 in upper wall 154 to form a generally circular opening 1.80 which is designed to receive the beverage container. The edges of partial circular aperture 174 and partial circular openings 156 may each be provided with a foam rubber ring 182 which enables circular opening 180 to accommodate a variety of beverage container sizes as shown in phantom in FIG. 8. Foam rubber ring 182 also provides stability to the beverage container to eliminate any unnecessary or noisy movement. In addition, the upper surface of cup base 158 of each arm 118 can be supplied with a rubber pad 184 to reduce the amount of unnecessary and noisy movement of the beverage container placed in holder 10. Partial circular opening 180 does not extend into a complete circle. A portion of the circumference of the circle is left open in order to accommodate the handle of the coffee cup or the like. By positioning the open area of partial circular opening 180 adjacent to the front face of holder 110, the coffee cup handle is positioned at the most accessible location for the vehicle occupants.

The operation of holder 110 is similar to holder 10 and begins with holder 110 in the retracted position (not shown). When access to ashtray 116 is desired, the individual simply pulls on handle 162 and frame 114 slides out of housing 112 to expose ashtray 116. The individual pivotable arms 118 remain in a closed position due to the slip fit relationship between arm 118 and frame 114. If the individual desires to place a boxed type of drink in holder 110, ashtray 116 can be removed and set aside exposing generally rectangular receptacle 150. After frame 114 has been extended from housing 112, either or both of the individuals in the vehicle are able to pivot their individual pivotable arms 118 out from frame 114 by pulling on the handles created by side wall 166 of arm 118. Once positioned in their open position, arms 118 and frame 114 form the individual holders of holder 110. When it becomes necessary to close holder 110, all that needs to be done is to push arms 118 into their closed position and push frame 114 into its retracted position. As an alternative, it is possible to simply push frame 114 into its retracted position and rely on the edges of housing 112 working against side walls 166 of arms 118 to cam arms 118 into a closed position if desired.

In order to provide additional convenience to the operator and other occupants of the vehicle, it may be desirable to add a drawer 190 as shown in FIG. 9 to beverage container holder 110. Drawer 190 slidably engages frame 114 or housing 112, and normally includes a coin holder. Drawer 190 is located in the area between vertical walls 148 and between lower wall 144 and upper wall 154 of frame 114. This is the same area where ashtray 116 is located. Drawer 190 is operable to move from a retracted position to an extended position. Drawer 190 is preferably slidingly engaged with frame 114 by engagement with a pair of tracks 192 extending from vertical walls 148. Drawer 190 comprises a box like container 194 and a box like cover 196. Container 194 slidably engages the pair of tracks 192. Cover 196 is hingedly attached to container 194 and when closed, creates a closed box for holding loose coins and the like. Both container 194 and cover 196 may be provided with a loam rubber insert 197 to eliminate the rattling of the loose coins in drawer 190. In its retracted position, drawer 190 is located behind ashtray 116 and with frame 114 in its extended position, only the front portion of cover 196 extends outside of housing 112. When access to drawer 190 is desired, the individual pulls on a handle 198 formed into cover 196 and extends drawer 190 over the top of ashtray 116 into the extended position for drawer 190 as shown in FIG. 9. In this position, cover 196 is free to open and provide access to the contents of drawer 190. The rear portion of ashtray 116 is cut away as shown in FIG. 9 to provide for clearance of drawer 190 to enable drawer 190 to move between its retracted and extended position.

While the above detailed description describes the preferred embodiment of the present invention, it should be understood that the present invention is susceptible to modification, variation and alteration without deviating from the scope and fair meaning of the subjoined claims.

What is claimed is:

1. A container holder comprising:

a housing having a top surface and a bottom surface;

a frame disposed between said top and bottom surfaces and slidably mounted to said housing for movement between a retracted position within said housing and an extended position partially spaced apart from said housing, said frame having a first portion defining a central open area, said frame having a second portion defining a first partially circular opening;

a first arm disposed within said frame and having means for supporting a first container in a first direction disposed therein, said first arm defining a second partially circular opening and including a first pivot pin for pivotably mounting said first arm to said frame such that said first arm is movable between a closed position and an open position, said second partially circular opening of said first arm cooperating with said first partially circular opening of said frame to define a first partially circular aperture when in said open position, said first partially circular aperture operable to receive said first container; and a first support base pivotably mounted to said frame by said pivot pin, said first support base supporting said first container in a second direction, said second direction being generally perpendicular to said first direction;

wherein said first support base comprises a first cup base pivotably attached by said pivot pin to said frame and operable to move from a raised stored position within said housing when said first arm is in said closed position to a lowered in use position wherein a portion of the first support base extend below said bottom surface of said housing when said first arm is in said open position.

2. The container holder of claim 1 further comprising an ashtray disposed within said central open area of said frame.

3. The container holder of claim 1 wherein said central open area includes means for supporting a container therein.

4. The container holder of claim 1 further comprising:

foam rubber means secured to the edge of said first circular opening, said foam rubber means extending into said first partially circular opening; and foam rubber means secured to the edge of said second partially circular opening, said foam rubber means extending into said second partially circular opening.

5. The container holder of claim 1 wherein said frame defines a third partially circular opening and said holder further comprises:

a second arm disposed within said frame and having means for supporting a second container in a third direction disposed therein, said third direction being generally parallel to said first direction said second arm defining a fourth partially circular opening and including a second pivot pin for pivotably mounting said second arm to said frame such that said second arm is movable between a closed position and an open position, said fourth partially circular opening of said second arm cooperating with said third partially circular opening of said frame to define a second partially circular aperture when in said open position, said second partially circular aperture operable to receive said second container; and a second support base pivotably mounted to said frame by said second pivot pin, said second support base supporting said second container in said second direction.

6. The container holder of claim 5 further comprising:

foam rubber means secured to the edge of said third circular opening, said foam rubber means extending into said third partially circular opening; and foam rubber means secured to the edge of said fourth partially circular opening, said foam rubber means extending into said fourth partially circular opening.

7. The container holder of claim 5 wherein said second support base comprises a second cup base pivotably attached to said frame and operable to move from a raised stored position when said second arm is in said closed position to a lowered in use position when said second arm is in said open position.

8. The container holder of claim 7 wherein said frame includes a second cammed surface which is engaged by said second cup base while said second cup base is moved from said raised stored position to said lowered in use position.

9. The container holder of claim 8 further comprising a cover attached to said frame, said cover provided adjacent to said cammed surface.

10. The container holder of claim 1, wherein said frame includes a first cammed surface which is engaged by said first cup base while said first cup base is moved from said raised stored position to said lowered in use position.

11. The container holder of claim 10, further comprising a cover attached to said frame, said cover provided adjacent to said cammed surface.

12. A container holder comprising:

a housing having a top surface and a bottom surface, said bottom surface being provided with a pair of centrally disposed walls extending a length thereof;

a frame disposed between said top and bottom surfaces and slidably mounted to said housing for movement between a retracted position within said housing and an extended position partially spaced apart from said housing, said frame having a first portion defining a central open area for receiving the centrally disposed walls of the bottom surface of the housing, said frame having a first and a second partially circular opening;

a first arm disposed within said frame and having means for supporting a first container in a first direction disposed therein, said first arm defining a third partially circular opening and including a first pivot pin for pivotably mounting said first arm to said frame such that said first arm is movable between a closed position and an open position, said third partially circular opening of said first arm cooperating with said first partially circular opening of said frame to define a first partially circular aperture when in said open position, said first partially circular aperture operable to receive a first container;

a second arm disposed within said frame and having means for supporting a second container in a first direction disposed therein, said second arm defining a fourth partially circular opening and including a second pivot pin for pivotably mounting said second arm to said frame such that said second arm is movable between a closed position and an open position, said fourth partially circular opening of said first arm cooperating with said second partially circular opening of said frame to define a second partially circular aperture when in said open position, said second partially circular aperture operable to receive a second container;

a first support base pivotably mounted to said frame by said first pivot pin, said first support base supporting said first container in a second direction, said second direction being generally perpendicular to said first direction;

a second support base pivotably mounted to said frame by said second pivot pin, said second support base supporting said second container in a second direction, said second direction being generally perpendicular to said first direction; and a plurality of leaf springs disposed along an outer surface of said centrally disposed walls, said leaf springs pressing against said first portion of said frame in order to provide a controlled sliding friction between said frame and said housing.

* * * * *

UNITED STATES PATENT AND TRADEMARK OFFICE
CERTIFICATE OF CORRECTION

PATENT NO. : 5,487,519
DATED : January 30, 1996
INVENTOR(S) : David N. Grabowski It is certified that error appears in the above-identified patent and that said Letters Patent is hereby corrected as shown below:

Col. 1, Line 43, "treeing" should be --freeing--

Col. 1, Line 47, "told" should be --fold--

Col. 5, Line 20, "and." should be --and--

Col. 5, Line 59, "upper 154" should be --upper wall 154--

Col. 5, Line 61, "arm 1.18" should be --arm 118--

Col. 6, Line 22, "opening 1.80" should be --opening 180--

Col. 7, Line 13, "loam" should be --foam--

Signed and Sealed this

Thirtieth Day of July, 1996

Attest:

BRUCE LEHMAN

*Attesting Officer*     *Commissioner of Patents and Trademarks*